Patented Feb. 9, 1954

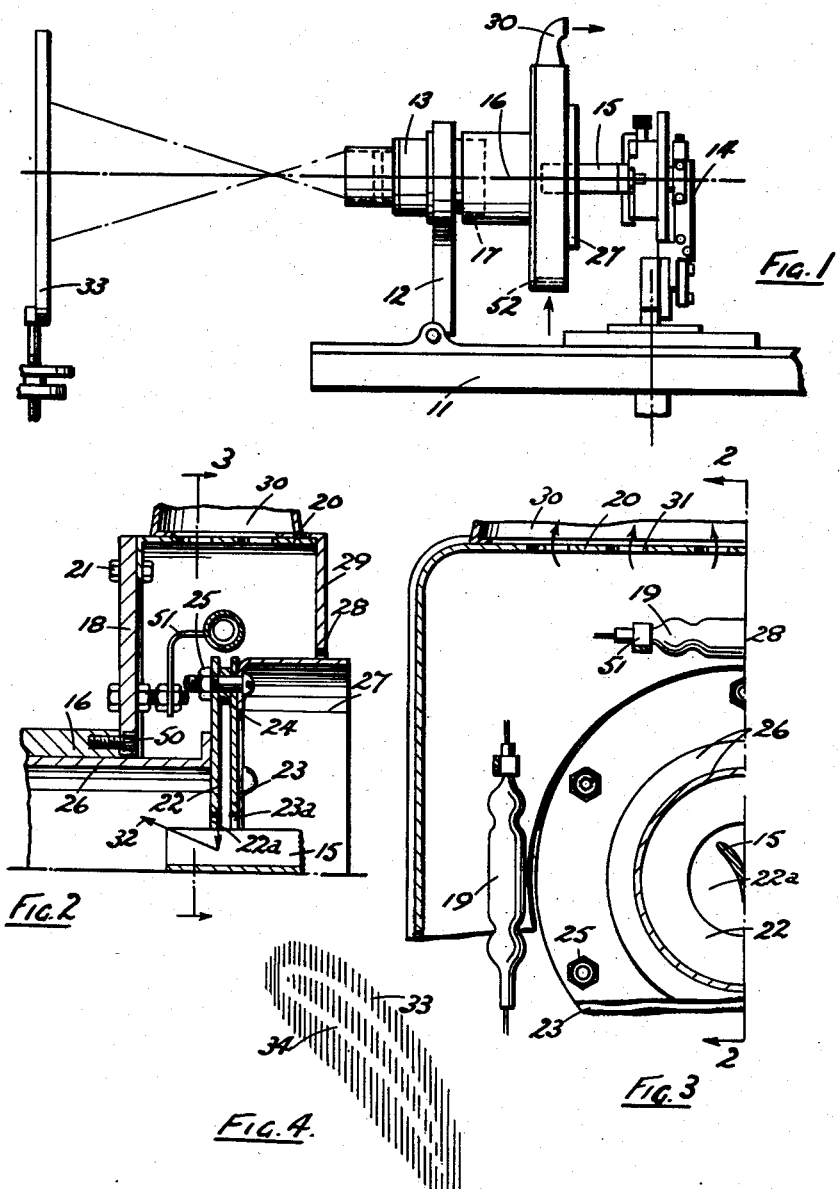
Feb. 9, 1954   J. WALKER ET AL   2,668,475
OPTICAL APPARATUS FOR INSPECTING THE CONTOUR OF ARTICLES
Filed Dec. 10, 1951
INVENTORS
JACK WALKER &
PENNOCK LENG
By Mawkinney & Mawkinney
ATTYS.

2,668,475

UNITED STATES PATENT OFFICE 2,668,475

OPTICAL APPARATUS FOR INSPECTING THE CONTOUR OF ARTICLES

Jack Walker and Pennock Leng, Coventry, England, assignors to Armstrong Siddeley Motors Limited, Coventry, England Application December 10, 1951, Serial No. 260,786

3 Claims. (Cl. 88—24)

1

This invention relates to an optical apparatus for use in inspecting, or comparing with a marking or picture of the outline of a master, a contour of a turbine blade or other article, of the kind in which just the portion of the surface of the article to be dealt with (such portion being provided with a surface giving diffused reflection) is brightly illuminated by means of light sources angularly disposed in a plane round it, the light rays emanating from the illuminated portion being arranged to reach an objective lens means from which they are projected on to a screen as a magnified image.

Our object is to provide an inexpensive apparatus of this kind, and, in particular, an arrangement of the light sources, which can be used in connection with a standard form of projector, object lens means, and screen.

According to the invention, the light sources are high pressure discharge lamps in which the alignment of the arc is critically maintained, and in combination therewith are two substantially parallel plates spaced from one another to a predetermined extent and with the central plane of the space coinciding with that of the light sources, the plates having openings in them to receive the article with the said portion of its surface in the said plane.

In the accompanying drawings:

Figure 1 is a side elevation of an apparatus according to the invention, also showing a screen on to which the image is projected;

Figure 2 is a vertical section through the means for illuminating an object to be inspected, the section being on the line 2—2 of Figure 3;

Figure 3 is a section on the line 3—3 of Figure 2; and

Figure 4 indicates the form of image of the object (e. g., a turbine blade) received on the screen.

The apparatus shown includes a base 11 on which is supported, through an upright 12, a standard form of projector 13, and a holder, indicated generally at 14, for an object to be inspected (e. g., a turbine blade 15 in the example shown). The illuminating arrangement has a frame tube 16 of which one end can be slid over a tubular portion 17 of the projector for supporting purposes and by which focusing can be effected.

To the other end of the frame tube 16 is secured, as by screws 50, the front wall 18 of a generally rectangular casing of which the axis is coaxial with the frame tube. The casing serves as a housing for four angularly-spaced mercury vapour discharge lamps 19, which are mounted

2 from posts 51 fast with the wall 18 and which are of the kind having the alignment of the arcs critically maintained. As will be well understood, each lamp is in series with its own choke, all the lamps being connected in parallel.

The front wall 18 has an opening in it coextensive with the bore of the frame tube and, at its periphery, an axially-directed wall 20 which is held in position by nuts and bolts 21.

Within the casing are two plates 22, 23 which are closely spaced by spacers 24, and held together as by nuts and bolts 25. The plate 22 is fast with a sleeve 26 having a sliding engagement with the interior of the frame tube 16, and by axial adjustment of the sleeve in the frame tube the central plane of the space between the plates 22, 23 can be made to be coincident with the plane containing the arcs of the lamps. The sleeve 26 additionally serves to screen from the light rays the forward end of the article under examination.

The article is held by the holder 14 in coaxial holes 22a, 23a in the plates, and the rear of the article is screened from the light rays by means of an axially-extending flange 27 which is fast with the plate 23, as by the nuts and bolts 25, and extends through an opening 28 in the rear wall 29 of the casing. The flange 27 provides access to the interior of the casing for the insertion of the article which is to be examined.

At the bottom of the casing are holes (not shown) serving as an inlet for cooling air, and at the top thereof there are holes 31 leading to a chimney 30 through which the cooling air may leave. If desired, a baffle, indicated in Figure 1 at 52, can be provided within the casing for preventing emission of light through the air inlet holes, and the chimney outlet can be turned through an angle, as shown, for the like purpose.

For examining an article, such as the turbine blade 15 shown, the article is first coated with, for example, deposited magnesium vapour so as to render the surface suitable for reflecting the sheet of incident light in a diffused manner. By appropriately adjusting the axial position of the frame tube, focusing can be effected of the edge of the illuminated band of the article which is nearer to the objective lens of the projector. An operative ray of the focused edge of the band is indicated at 32 in Figure 2, and the diffused reflection from the illuminated band passes through the projector 13 to produce on a screen 33 an illuminated zone 34 of which the inner periphery is formed by the focused edge and defines the exact shape of the section of the article under examination. The holder 14 is of any suitable form which will enable the article 15 to be adjusted axially for examination of different axial zones, and also enable the position of the article to be adjusted in two directions at right-angles for centering, or otherwise desirably disposing it in the openings 22a, 23a.

By arranging for the negative post 51 of each lamp to be in the inward path of the plate 22 and of a sufficient length, they can act as stops, during longitudinal adjustment of the plates.

According to the article to be examined, or for desirably varying the width of the illuminated band of the article, the spacers 24 can be substituted by others of a different thickness.

It will be understood that more, or less than the four lamps 19 mentioned can be provided, and also that suitable reflectors can be positioned within the casing for reflecting radially-outward light emission from the lamps to between the two plates in the intervals between adjacent lamps.

What we claim as our invention and desire to secure by Letters Patent of the United States is:

1. An optical apparatus for inspecting the contour of an article, which has a matt surface, by light diffusedly reflected from the article through a projector on to a screen, comprising a casing having at one side an opening; a frame tube fast with said casing and concentrically disposed about said opening, said frame tube adapted for connection to the projector; a pair of spaced parallel opaque plates within said casing, said plates having registering central holes for the reception axially therein of the article to be examined and in alignment with said frame tube, one of said plates having a tube concentrically about its hole, said plate tube slidably guided within said frame tube, whereby said plates can be axially adjusted within said casing, the other of said plates having an axial peripheral flange extending through an opening in the opposite side of said casing; a ring of high pressure discharge lamps fixedly mounted in said casing and arranged for their arcs to be co-planar and disposed about the plates such that the plane of said arcs is coincident with the central plane of the space between said plates for obtaining a localised plane of illumination about the article to be examined, whilst said plate tube and said flange screen the article from all light except that passing between said plates; and means for supporting said article to be within the holes of said plates.

2. An optical apparatus for inspecting the contour of an article, which has a matt surface, by light diffusedly reflected from the article through a projector on to a screen, comprising a casing, having at one side an opening; a frame tube fast with said casing and concentrically disposed about said opening, said frame tube adapted for connection to the projector, a pair of spaced parallel opaque plates within said casing, said plates having registering central holes for the reception axially therein of the article to be examined and in alignment with said frame tube, one of said plates having a tube concentrically about its hole, said plate tube slidably guided within said frame tube, whereby said plates can be axially adjusted within said casing; a ring of high pressure discharge lamps; mountings from said casing for said ring of lamps to hold the latter with their arcs co-planar and disposed about the plates such that the plane of said arcs is coincident with the central plane of the space between said plates for obtaining a localised plane of illumination about the article to be examined.

3. An optical apparatus for inspecting the surface contour of an article having a matt surface, by light diffusedly reflected from the article through a projector on to a screen, comprising a pair of spaced parallel opaque plates having central openings therethrough in axial registry with one another and with the lens of said projector, a frame about said plates, a forward light shield carried by one of said plates and being telescopically receivable through a portion of said frame, a rear light shield carried by the other of said plates and extending through the rear of said frame, means for joining said plates in spaced relationship, a source of high intensity light rays generated within said frame and directed radially inwardly and circumferentially through the spacing between said plates upon the surface to be inspected and means for supporting the article the surface contour of which is to be inspected within the openings of said plates coaxially therewith whereby only the portion of the article in registry with the space between said front and rear plates will be illuminated by said light source.

JACK WALKER.
PENNOCK LENG.

References Cited in the file of this patent

UNITED STATES PATENTS

| Number | Name | Date |
|---|---|---|
| 1,837,979 | Mensman | Dec. 22, 1931 |
| 2,574,119 | Motter | Nov. 6, 1951 |
| 2,607,267 | Fultz | Aug. 19, 1952 |